United States Patent [19]

Coran

[11] Patent Number: 5,036,133
[45] Date of Patent: Jul. 30, 1991

[54] RUBBER COMPOSITIONS CONTAINING A VINYLPYRIDINE-BUTADIENE INTERPOLYMER CO-ACTIVATOR

[75] Inventor: Aubert Y. Coran, Akron, Ohio
[73] Assignee: Monsanto Company, St. Louis, Mo.
[21] Appl. No.: 420,485
[22] Filed: Oct. 12, 1989

Related U.S. Application Data

[63] Continuation-in-part of Ser. No. 205,968, Jun. 13, 1988, Pat. No. 4,869,968.

[51] Int. Cl.$^5$ .............. C08K 3/04; C08K 3/36; C08L 7/00; C08L 9/00
[52] U.S. Cl. .................. 524/526; 525/192; 525/203
[58] Field of Search ........... 525/192, 263, 236, 237; 524/526

[56] References Cited

U.S. PATENT DOCUMENTS

| | | | |
|---|---|---|---|
| 2,893,971 | 7/1959 | Kennedy et al. | 525/203 |
| 2,984,644 | 5/1961 | Wheat | 525/203 |
| 3,114,409 | 12/1963 | Iknayan et al. | 525/203 |
| 3,993,847 | 11/1976 | Kondo | 428/451 |
| 4,960,819 | 10/1990 | Sandstrom et al. | 524/516 |

FOREIGN PATENT DOCUMENTS 0185551 12/1985 European Pat. Off. .
818285 5/1959 United Kingdom .

OTHER PUBLICATIONS

V. G. Epshtein et al.-"Low-Temperature Copolymers-", Soviet Rubber Technol. 18(9) 13(196).
W. W. Rinne et al-"Effect of 2-Vinylpyridine-", I&E Chem 40(8), 1437 (1948).

*Primary Examiner*—Allan M. Lieberman
*Attorney, Agent, or Firm*—Gordon B. Seward

[57] ABSTRACT

Sulfur curable rubber compositions have improved properties such as cure rate and scorch delay when prepared by using an organic accelerator and a co-activator which is an interpolymer made from vinylpyridine and one or more diene monomers. The amount of the vinylpyridine units in the co-activator is generally from about 10 percent to about 75 percent by weight. The rubber compositions can contain either carbon black or silica.

22 Claims, 1 Drawing Sheet

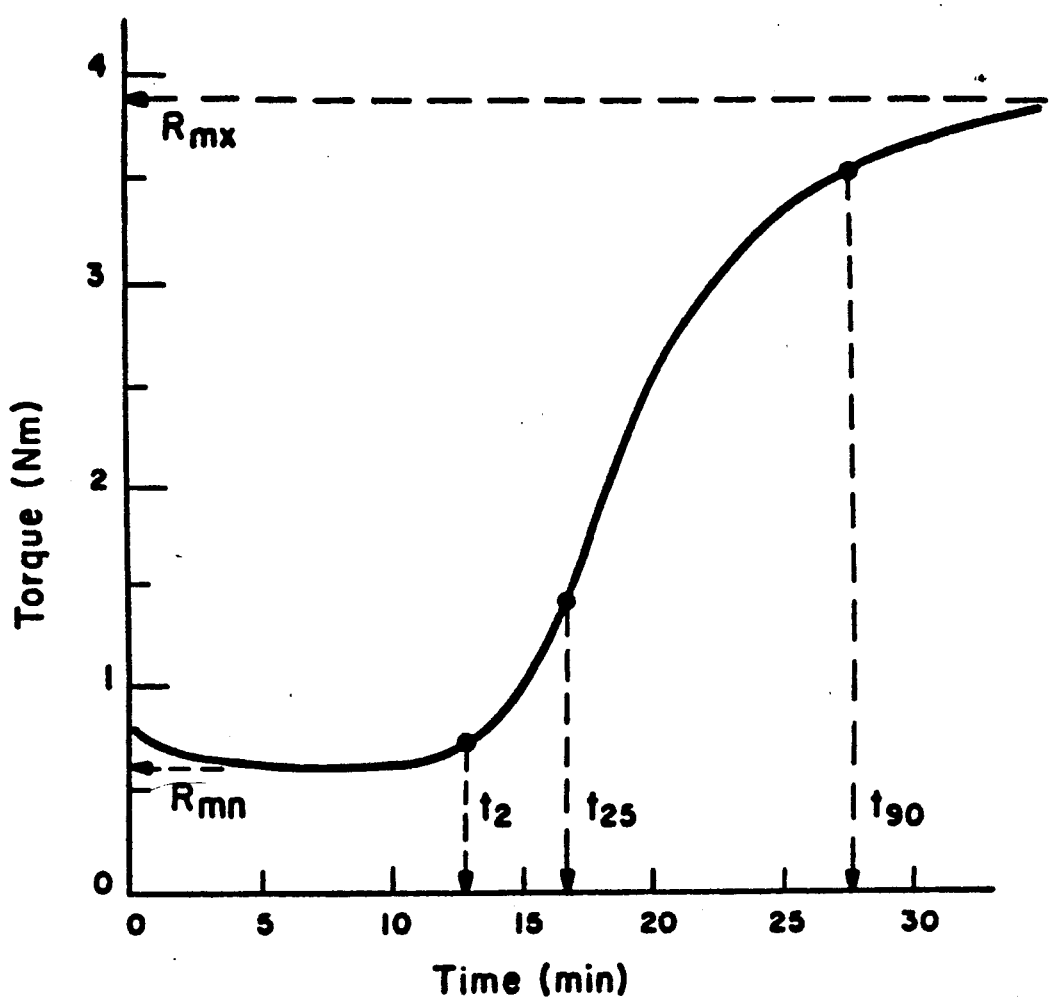
VULCANIZATION PARAMETERS

RUBBER COMPOSITIONS CONTAINING A VINYLPYRIDINE-BUTADIENE INTERPOLYMER CO-ACTIVATOR

CROSS-REFERENCE

This application is a continuation-in-part of U.S. patent application Ser. No. 205,968, June 13, 1988, now U.S. Pat. No. 4,869,968 for "Rubber Compositions Containing Polymeric Activators."

FIELD OF THE INVENTION

The present invention relates to sulfur-vulcanizable rubber compounds which can contain high amounts of natural rubber therein, carbon black, as well as an interpolymer co-activator made from vinylpyridine and diene monomers. The present invention also relates to sulfur-vulcanizable rubber compounds made from synthetic rubber, natural rubber, or blends thereof which contain silica as well as the interpolymer co-activator made from vinylpyridine and diene monomers.

BACKGROUND OF THE INVENTION

Interpolymers made from vinylpyridine monomers and conjugated diene monomers are known. These interpolymers have been used as oil-resistant rubbers in a variety of applications and as adhesives between textile cords and rubber.

In an article, "Industrial and Engineering Chemistry," 40, (8) 1437 (1948), by Rinne and Rose, it was shown that the rate of cure and physical properties of general purpose styrene butadiene rubber could be improved by substituting small amounts of vinylpyridine (2.5 to 5 percent) for styrene in the polymer preparation.

A copolymer of butadiene (85 percent) and 2-methyl-5-vinylpyridine (15 percent) prepared at low temperatures was disclosed by Epshtein et al, Soviet Rubber Technology, 18, 13,(1960). Epshtein noted this copolymer was not considered to be compatible with other rubbers since blends therewith had poor mechanical properties. It was thus postulated that the copolymer cured so fast that other rubbers could not compete for the curatives to make strong blends.

D'Ianni et al, in a private communication cited in the above article to Rinne and Rose, showed that styrene butadiene rubber made by copolymerization with as little as one percent vinylpyridine was cured in a shorter time than the unmodified SBR control.

U.S. Pat. No. 3,993,847 to Kondo, relates to improved bond strength at ambient and elevated temperatures of composite articles of rubber adhered to ferrous metal substrates by using as an adhesive an interpolymer comprising a conjugated diene and a heterocyclic nitrogen base and containing about 5 to about 180 parts of silica filler per 100 parts by weight of the interpolymer.

U.S. Pat. No. 2,893,971 to Kennedy relates to a method of preparing synthetic rubber having increased modulus, by utilizing a small amount of a polymer prepared from a copolymerizable heterocyclic nitrogen base.

U.S. Pat. No. 2,984,644 to Wheat relates to a rubber which is a blend of butyl rubber with a small amount of a polymer prepared by polymerizing a conjugated diene with a minor amount of a copolymerizable heterocyclic nitrogen base.

British Patent No. 818,285 relates to a vulcanizable rubber composition containing from 0.1 to 10 percent by weight of the rubber of a polymer of vinylpyridine.

Heretofore, rubber or rubber blend compositions containing silica as a filler at levels greater than 10 to 15 percent of the rubber polymer by weight, generally had poor (slow) cure rates. Moreover, when cured, those compositions generally had increased scorch rates and moduli. Faster cure rates are very desirable since faster rates of production of rubber articles can thus be obtained. Molded rubber articles can be removed from the mold at an earlier time without the danger of undercure. While it is always possible to increase the cure rate of a rubber compound (up to a point) by using combinations of accelerators and/or higher levels of accelerators, these changes are often accompanied by an unacceptable loss of scorch delay or unacceptable increases in the moduli of the rubber in the vulcanized articles.

SUMMARY OF THE INVENTION

It has been found that combinations of sulfur, conventional vulcanization accelerators, an interpolymer co-activator made from a vinylpyridine monomer (or a mixture of vinylpyridines) and a diene hydrocarbon monomer (or a mixture of hydrocarbon monomers) in a sulfur-vulcanizable synthetic rubber, or in a blend of such synthetic rubber with natural rubber, optionally containing a carbon black filler produced unexpected improvements in vulcanization behavior as indicated by t90-t2 (an inverse measure of overall cure rate) as well as t25-t2 (an inverse measure of early cure rate). In addition to faster cure rates, a minimum increase in the modulus of cured rubber, due to the addition of the co-activator, occurs.

It has also been found that combinations of sulfur, conventional vulcanization accelerators and the above Co-activator in a sulfur-vulcanizable synthetic rubber, or natural rubber, or blends thereof, which combinations also contain a silica filler, produce unexpected improvements in vulcanization behavior as indicated by t90-t2 as well as by t25-t2 values and result in only a minimum increase in the modulus of the cured rubber.

BRIEF DESCRIPTION OF THE DRAWING

The drawing is a typical rheograph showing the parameters of vulcanization.

DETAILED DESCRIPTION OF THE INVENTION

Butadiene-based synthetic rubbers, useful in the compositions of the invention include butadiene homopolymers and copolymers from 1,3-butadiene and a vinyl aromatic comonomer, such as styrene or alphamethyl styrene. The butadienestyrene copolymers preferably contain minor amounts of styrene and major amounts of butadiene; such preferred copolymers are known as SBR copolymers. Butadiene homopolymers include those having predominantly cis-1,4 microstructure, and homopolymers which have substantial contents of trans-1,4 or 1,2 microstructure. The rubbers used in the invention are preferably "elastomeric" materials; that is they conform, when vulcanized, to the definition of an elastomeric or rubbery material found in ASTM D 1566.

A composition of the invention contains a butadiene-based synthetic rubber, sulfur and a vulcanization accelerator. Sulfur is present in the butadiene polymers as a source of crosslinks; typically, lower amounts of sulfur produce vulcanizates having lower crosslink densities, and a resultant low "state of cure." Very high amounts of sulfur, conversely, produce vulcanizates having high crosslink densities, and a resultant high "state of cure." Extremely high sulfur levels result in "hard rubber" or ebonite. Preferred sulfur levels in the butadiene polymers are from 0.2 to 4 parts by weight per 100 parts by weight of polymer.

Vulcanization accelerators useful in the compositions of the invention include a large number of well-known materials. Typical accelerators are listed in the "Rubber World Bluebook." The choice of which accelerator (or accelerators) to use can depend on a number of factors, and is not critical to the invention. Among usable accelerators are thiazoles, such as 2-mercaptobenzothiazole and benzothiazyldisulfide; benzothiazylsulfenamides, such as N-cyclohexyl-2-benzothiazylsulfenamide, N,N-dicyclohexylbenzothiazylsulfenamide, N,N-diethylbenzothiazylsulfenamide, N,N-diisopropylbenzothiazylsulfenamide, N-oxydiethylenebenzothiazylsulfenamide, N-isopropylbenzothiazylsulfenamide and N-t-butylbenzothiazylsulfenamide; guanidines, such as di-orthotolylguanidine and diphenyl guanidine; thioureas, such as ethylenethiourea, tetramethylthiourea, N,N'-diethylthiourea and N,N'-dibutylthiourea; thiurams, such as N,N'-dimethyl-N,N'-diphenylthiuram disulfide, dipentamethylenethiuram hexasulfide, tetrabutylthiuram monosulfide, tetraethylthiuram disufide, tetrabutylthiuram disulfide and tetramethylthiuram disulfide; xanthates, such as zinc dibutyl xanthate and dibutyl xanthogen disulfide; and dithiocarbamates, including various salts of di-lower alkyl dithiocarbamic acid, such as the zinc, lead, ferric, copper, selenium, sodium, tellurium, potassium, bismuth, dimethylammonium and cyclohexylammonium salts.

The amount of accelerator used will vary widely, depending on the type used and the result desired, as is well known in the art. Preferred levels of accelerator are from 0.2 to 5 parts by weight per 100 parts by weight of butadiene polymer.

The activators of the invention, which are essential components of the rubber composition, are interpolymers of vinylpyridine monomer and diene hydrocarbon comonomer in which the co-polymer preferably contains from 20 percent to 65 percent, more preferably 30 percent to 55 percent, and even more preferably 35 percent to 50 percent by weight of vinylpyridine units. The interpolymer activators can be produced by copolymerization of vinylpyridine monomer and diene hydrocarbon monomer in known polymerization reactions. Preferred vinylpyridine monomers include 2-vinylpyridine, 4-vinylpyridine and 2-methyl-5-vinylpyridine. Preferred diene hydrocarbon monomers include 1,3-butadiene, isoprene and piperylene, with 1,3-butadiene being especially preferred. Other comonomers can be included, such as styrene, for example, but copolymers from 1,3-butadiene and one of the listed preferred vinylpyridine monomers are more preferred.

The rubber compositions of the invention can also contain typical compounding ingredients, such as antidegradants, fillers, extender oils, zinc oxide, stearic acid and other well-known materials normally used in butadiene polymer rubber compounds.

A more complete understanding of the invention can be obtained by reference to the following examples, in which all parts are by weight and all temperatures are in degrees Celsius, unless otherwise specified.

EXAMPLE I

Copolymers of 1,3-butadiene with 2-vinylpyridine and with 4-vinylpyridine are prepared by emulsion polymerization according to a procedure similar to that given by W. B. Reynolds, J. E. Prichard, M. H. Opheim and G. Kraus, *Rubber Chemistry and Technology*, 30, 338 (1948). The comonomers are charged into the reaction mixtures, with delayed additions, to give a series of butadiene copolymers containing various proportions of units derived from 2-vinylpyridine or from 4-vinylpyridine. The vinylpyridine content of each of the copolymers is determined by elemental analysis. The copolymers are listed in Table I.

TABLE I

| VINYLPYRIDINE-BUTADIENE COPOLYMERS | | | |
|---|---|---|---|
| Polymer Identification | Co-monomer | vinyl-pyridine in charge % | vinyl-pyridine in polymer % |
| 2VP1 | 2-vinylpyridine | 20 | 6.5 |
| 2VP1A | 2-vinylpyridine | 20 | 17.1 |
| 2VP2 | 2-vinylpyridine | 40 | 35.2 |
| 2VP2A | 2-vinylpyridine | 40 | 36.4 |
| 2VP3 | 2-vinylpyridine | 60 | 57.3 |
| 2VP3A | 2-vinylpyridine | 60 | 53.8 |
| 2VP4A | 2-vinylpyridine | 80 | 74.6 |
| 4VP1 | 4-vinylpyridine | 20 | 14.9 |
| 4VP1A | 4-vinylpyridine | 20 | 16.6 |
| 4VP2 | 4-vinylpyridine | 40 | 35.5 |
| 4VP3 | 4-vinylpyridine | 60 | 58.6 |
| 4VP4 | 4-vinylpyridine | 80 | 76 |

From Table I it may be seen that the various butadiene-vinylpyridine copolymers range from 6.5% to 76% vinylpyridine content.

EXAMPLE II

Each of the vinylpyridine copolymers is blended into a carbon black-filled SBR masterbatch at concentrations of 0.5, 1.0, 2.0, and 4.0 phr. (The abbreviation "phr" means parts per hundred of rubber, by weight.) Unfilled SBR 1502 (a copolymer of about 23% styrene and 73% butadiene) was added to each composition such that the amount of added SBR plus the added vinylpyridine copolymer was always 4.0 phr. Control compositions, each containing no vinylpyridine copolymer, but containing 4.0 phr of the unfilled SBR 1502, were also prepared and evaluated. The recipe for the masterbatch, in parts by weight, was as follows: SBR 1502, 100; N-330 carbon black (HAF), 50; Circosol 4240 naphthenic oil, 5; zinc oxide, 5; stearic acid, 2. The masterbatch was prepared by standard procedures in a Banbury mixer. The curatives, vinylpyridine copolymer activators, and 2.0 phr of N-1,3-dimethylbutyl-N'-phenyl-p-phenylenediamine antidegradant (SANTOFLEX ®-13) were added on a roll mill. Tests of the compositions were in accordance with the appropriate ASTM procedures for rubber. In each compound the curing system comprises 2.0 phr sulfur and 1.2 phr N-t-butyl-benzothiazylsulfenamide (SANTOCURE ® NS) accelerator. Vulcanization characteristics are determined by using the Mooney viscometer at 135° C. and the Monsanto Oscillating Disc Rheometer (ODR) at 153° C. Mooney scorch, a measure of scorch resistance (resistance to premature vulcanization) is taken as the time required for a 5 point rise from the minimum Mooney viscosity. Other parameters which characterize vulcanization are taken from the ODR cure curves ("rheographs"), which are obtained for Vulcanization at 153° C., according to FIG. 1. The parameters Rmin and Rmax are the minimum rheometer torque (before the onset of vulcanization) and the maximum rheometer torque (due to vulcanization), respectively. The parameter t2 is the time required for an increase (over Rmin) in rheometer torque of 2.2 dNm (2.0 in-lb); t25 is time required for the occurrence of 25% of the increase in torque due to vulcanization (time at R/(Rmax−Rmin)=0.25); t90 is the time required for the occurrence of 90% of the increase in torque due to vulcanization (time at R/(Rmax−Rmin)=0.90); and the vulcanization rate constant, K2, is a first-order rate constant estimated from the shape of the rheograph cure curve after the occurrence of an inflection point (the point of the curve corresponding to the maximum slope of torque increase per unit of time). Another measure of vulcanization rate is Vmax, the maximum slope of the rheometer curve divided by (Rmax-Rmin). This quotient, multiplied by 100, is given as the maximum velocity of vulcanization. It is reported in units of %/minute.

Test data are summarized in Tables II through XIII. "B-1 masterbatch" refers to the carbon black-filled SBR masterbatch containing all ingredients except the polymeric activators, sulfur, accelerator, antidegradant, and the "extra" SBR 1500 (added to keep the amount of added "rubbery polymer" constant). Relative values were determined by dividing the values obtained from the measurements of activator-containing stocks by the values obtained from the measurements of the corresponding control stock. In each case, the control stock, which contained no activator, was prepared from the same batch of masterbatch as was the experimental stock and was measured in the same set on the same day as was the experimental stock.

It can be seen that the presence of 0.5–2.0 phr of a vinylpyridine-butadiene copolymer only slightly affects the mechanical properties of black-filled SBR vulcanizates. Even the effects of 4.0 phr of a vinylpyridine copolymer are not very large. The most significant effect on mechanical properties of the vulcanizates, though relatively slight, is the small increase in log decrement (decrease in rebound). The effect of the vinylpyridine copolymer activators on the vulcanization characteristics is of primary importance.

The data indicate that the vinylpyridine copolymers are effective as cure-rate activators when the vinylpyridine content of the copolymer is between 20 and 65%, and are most effective when it is between 35 and 50%. The parameter K2 indicates the relative rate of vulcanization throughout most of the process after the crosslinking reaction is under way. The parameter t90-t2 is an inverse indication of the overall crosslinking reaction.

The parameter t25-t2 is an inverse indication of the rate of crosslink formation early in the crosslinking process. It is important since rubber products are frequently removed from the mold before the crosslinking process is complete. Removing an article from the mold as soon as practical (lest there be bubbles, porosity, etc.), prevents tearing of an article during its demolding and it saves expensive molding time. Thus, much of the vulcanization occurs while the article is still hot but removed from the mold.

TABLE II

| | 2-VP1 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° t5, min. | 30.6 | 30.7 | 30.4 | 29.0 | 28.4 |
| Oscil. Disc Rheometer data at 153° | | | | | |
| Rmax, Nm | 3.95 | 3.97 | 3.99 | 4.00 | 4.04 |
| Rmin, Nm | 0.59 | 0.59 | 0.59 | 0.60 | 0.61 |
| t90 | 23.3 | 26.8 | 26.0 | 24.3 | 23.2 |
| t25 | 17.0 | 16.5 | 16.5 | 15.6 | 15.2 |
| t2 | 13.5 | 13.0 | 12.9 | 12.3 | 12.0 |
| t90-t2 | 14.8 | 13.8 | 13.1 | 12.0 | 11.2 |
| t25-t2 | 3.5 | 3.5 | 3.6 | 3.3 | 3.2 |
| k2, min.-1 | 0.177 | 0.202 | 0.219 | 0.245 | 0.268 |
| t2/t25 | 0.794 | 0.787 | 0.781 | 0.788 | 0.789 |
| Stress-strain data, cured at 153° C. to Rmax (unaged) | | | | | |
| Shore A hardness | 66 | 66 | 65 | 65 | 67 |
| Stress at 300% strain, MPa | 13.1 | 13.6 | 14.2 | 14.0 | 15.0 |
| Ultimate tensile strength, MPa | 23.9 | 24.6 | 24.9 | 24.2 | 24.1 |
| Ultimate elongation, % | 471 | 482 | 466 | 459 | 434 |

TABLE III

| | 2-VP1A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° t5, min. | 28.5 | 28.5 | 28.0 | 26.5 | 26.0 |
| Oscil. Disc Rheometer data at 153° | | | | | |
| Rmax, Nm | 3.90 | 3.95 | 3.93 | 3.95 | 3.95 |
| Rmin, Nm | 0.59 | 0.59 | 0.59 | 0.59 | 0.61 |
| t90 | 27.7 | 25.0 | 23.7 | 22.3 | 19.3 |
| t25 | 16.4 | 15.7 | 14.9 | 14.6 | 13.0 |
| t2 | 13.2 | 12.6 | 12.0 | 12.0 | 10.7 |
| t90-t2 | 14.5 | 12.4 | 11.6 | 10.3 | 8.6 |
| t25-t2 | 3.2 | 3.1 | 2.9 | 2.6 | 2.3 |
| k2, min.-1 | 0.181 | 0.231 | 0.252 | 0.287 | 0.347 |
| t2/t25 | 0.804 | 0.802 | 0.805 | 0.821 | 0.823 |
| Stress-strain data, cured at 153° C. to Rmax | | | | | |
| Shore A hardness | 65 | 66 | 67 | 67 | 67 |
| Stress at 300% strain, MPa | 13.0 | 13.1 | 13.5 | 13.4 | 13.5 |
| Ultimate tensile strength, MPa | 23.2 | 24.0 | 23.7 | 20.8 | 21.7 |
| Ultimate elongation, % | 459 | 471 | 457 | 415 | 427 |

TABLE IV

| | 2-VP2 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS | 1.2 | 1.2 | 1.2 | 1.2 | 1.2 |

TABLE IV-continued

| | 2-VP2 | | | | |
|---|---|---|---|---|---|
| accelerator | | | | | |
| Sulfur | 2.0 | 2.0 | 2.0 | 2.0 | 2.0 |
| Mooney scorch 135° | | | | | |
| t5, min. | 30.8 | 26.7 | 27.0 | 26.1 | 24.5 |
| Oscil. Disc Rheometer data at 153° | | | | | |
| Rmax, Nm | 3.94 | 3.93 | 3.94 | 3.94 | 3.85 |
| Rmin, Nm | 0.59 | 0.60 | 0.59 | 0.61 | 0.62 |
| t90 | 28.5 | 24.0 | 22.2 | 19.5 | 17.8 |
| t25 | 16.8 | 15.3 | 14.5 | 13.3 | 12.5 |
| t2 | 13.2 | 12.5 | 11.7 | 11.0 | 10.5 |
| t90-t2 | 15.3 | 11.5 | 10.5 | 8.5 | 7.3 |
| t25-t2 | 3.6 | 2.8 | 2.8 | 2.3 | 2.0 |
| k2, min.-1 | 0.173 | 0.252 | 0.287 | 0.320 | 0.416 |
| t2/t25 | 0.785 | 0.816 | 0.806 | 0.827 | 0.84 |
| Stress-strain data, cured at 153° C. to Rmax (unaged) | | | | | |
| Shore A hardness | 61 | 63 | 66 | 66 | 70 |
| Stress at 300% strain, MPa | 11.9 | 12.6 | 12.7 | 12.3 | 12.0 |
| Ultimate tensile strength, MPa | 23.9 | 23.4 | 23.9 | 21.8 | 22.5 |
| Ultimate elongation, % | 491 | 470 | 487 | 463 | 496 |

TABLE V

| | 2-VP2A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.9 | 28.2 | 28.5 | 26.8 | 24.1 |
| Oscil. Disc Rheometer data at 153° | | | | | |
| Rmax, Nm | 3.95 | 3.98 | 3.99 | 3.97 | 3.88 |
| Rmin, Nm | 0.59 | 0.59 | 0.59 | 0.60 | 0.62 |
| t90 | 27.3 | 24.2 | 22.3 | 20.0 | 17.3 |
| t25 | 16.4 | 15.7 | 14.9 | 13.8 | 12.4 |
| t2 | 13.0 | 12.9 | 12.1 | 11.5 | 10.5 |
| t90-t2 | 14.3 | 11.3 | 10.2 | 8.5 | 6.8 |
| t25-t2 | 3.4 | 2.8 | 2.8 | 2.3 | 1.9 |
| k2, min.-1 | 0.189 | 0.252 | 0.297 | 0.347 | 0.438 |
| t2/t25 | 0.792 | 0.821 | 0.812 | 0.833 | 0.846 |
| Stress-strain data, cured at 153° C. to Rmax (unaged) | | | | | |
| Shore A hardness | 66 | 67 | 68 | 71 | 73 |
| Stress at 300% strain, MPa | 13.4 | 13.7 | 14.2 | 14.0 | 14.0 |
| Ultimate tensile strength, MPa | 24.7 | 23.5 | 25.1 | 20.1 | 23.5 |
| Ultimate elongation, % | 467 | 448 | 470 | 392 | 459 |

TABLE VI

| | 2-VP3 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.9 | 28.2 | 28.5 | 26.8 | 24.1 |
| Oscil. Disc Rheometer data at 153° | | | | | |
| Rmax, Nm | 3.90 | 3.98 | 4.00 | 396 | 3.79 |
| Rmin, Nm | 0.60 | 9.60 | 0.60 | 0.61 | 0.61 |
| t90 | 26.3 | 24.0 | 21.5 | 18.9 | 16.1 |
| t25 | 15.3 | 14.7 | 13.9 | 12.5 | 11.2 |
| t2 | 12.2 | 11.8 | 11.2 | 10.2 | 9.5 |
| t90-t2 | 14.1 | 12.2 | 10.3 | 8.7 | 6.6 |
| t25-t2 | 3.1 | 2.9 | 2.7 | 2.3 | 1.7 |
| k2, min.-1 | 0.189 | 0.245 | 0.297 | 0.347 | 0.438 |
| t2/t25 | 0.797 | 0.802 | 0.805 | 0.816 | 0.848 |
| Stress-strain data, cured at 153° C. to Rmax (unaged) | | | | | |
| Shore A hardness | 60 | 65 | 65 | 67 | 70 |
| Stress at 300% strain, MPa | 12.0 | 12.4 | 12.4 | 12.0 | 11.4 |
| Ultimate tensile strength, MPa | 23.7 | 23.8 | 21.9 | 22.1 | 22.9 |
| Ultimate elongation, % | 497 | 489 | 549 | 478 | 525 |

TABLE VII

| | 2-VP3A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.8 | 27.5 | 25.5 | 25.1 | 22.8 |
| Oscil. Disc Rheometer data at 153° | | | | | |
| Rmax, Nm | 3.92 | 4.02 | 4.04 | 3.99 | 3.82 |
| Rmin, Nm | 0.61 | 0.61 | 0.62 | 0.60 | 0.62 |
| t90 | 27.1 | 23.5 | 21.4 | 18.8 | 16.3 |
| t25 | 15.9 | 14.7 | 13.8 | 12.6 | 11.4 |
| t2 | 12.6 | 11.8 | 11.1 | 10.4 | 9.7 |
| t90-t2 | 14.5 | 11.7 | 10.3 | 8.4 | 6.6 |
| t25-t2 | 3.3 | 2.9 | 2.7 | 2.2 | 1.7 |
| k2, min.-1 | 0.185 | 0.252 | 0.297 | 0.320 | 0.462 |
| t2/t25 | 0.792 | 0.802 | 0.804 | 0.825 | 0.850 |
| Stress-strain data, cured at 153° C. to Rmax (unaged) | | | | | |
| Shore A hardness | 65 | 68 | 67 | 66 | 70 |
| Stress at 300% strain, MPa | 12.6 | 12.6 | 12.3 | 12.2 | 11.6 |
| Ultimate tensile strength, MPa | 21.9 | 20.9 | 19.7 | 21.8 | 21.2 |
| Ultimate elongation, % | 455 | 432 | 418 | 464 | 483 |

TABLE VIII

| | 2-VP4A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 28.5 | 29.5 | 26.5 | 24.4 | 20.0 |
| Oscil. Disc Rheometer data at 153° | | | | | |
| Rmax, Nm | 3.92 | 3.92 | 3.94 | 3.91 | 3.94 |
| Rmin, Nm | 0.62 | 0.63 | 0.63 | 0.63 | 0.65 |
| t90 | 26.5 | 25.9 | 25.0 | 24.5 | 20.5 |

TABLE VIII-continued

| | 2-VP4A | | | | |
|---|---|---|---|---|---|
| t25 | 15.4 | 15.0 | 14.4 | 14.0 | 11.6 |
| t2 | 12.2 | 12.0 | 11.5 | 10.9 | 9.3 |
| t90-t2 | 14.3 | 13.9 | 13.5 | 13.6 | 11.2 |
| t25-t2 | 3.2 | 3.0 | 2.9 | 3.1 | 2.3 |
| k2, min.-1 | 0.185 | 0.189 | 0.198 | 0.208 | 0.245 |
| t2/t25 | 0.792 | 0.8 | 0.798 | 0.778 | 0.801 |
| Stress-strain data, cured at 153° C. to Rmax (unaged) | | | | | |
| Shore A hardness | 65 | 65 | 67 | 70 | 72 |
| Stress at 300% strain, MPa | 12.6 | 12.9 | 12.9 | 12.2 | 12.9 |
| Ultimate tensile strength, MPa | 22.3 | 21.5 | 20.9 | 19.4 | 17.2 |
| Ultimate elongation, % | 459 | 439 | 443 | 419 | 373 |

TABLE IX

| | 4-VP1 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° t5, min. | 29.5 | 28.0 | 26.5 | 24.5 | 21.6 |
| Oscil. Disc Rheometer data at 153° | | | | | |
| Rmax, Nm | 3.96 | 4.01 | 4.06 | 4.10 | 4.15 |
| Rmin, Nm | 0.56 | 0.58 | 0.60 | 0.65 | 0.69 |
| t90 | 27.8 | 25.0 | 23.3 | 20.3 | 17.7 |
| t25 | 16.2 | 15.4 | 14.6 | 13.1 | 11.5 |
| t2 | 12.8 | 12.2 | 11.8 | 10.8 | 9.5 |
| t90-t2 | 15.0 | 12.8 | 11.5 | 9.5 | 8.2 |
| t25-t2 | 3.4 | 3.2 | 2.8 | 2.3 | 2.0 |
| k2, min.-1 | 0.177 | 0.213 | 0.245 | 0.287 | 0.347 |
| t2/t25 | 0.790 | 0.792 | 0.808 | 0.824 | 0.826 |
| Stress-strain data, cured at 153° C. to Rmax (unaged) | | | | | |
| Shore A hardness | 66 | 66 | 68 | 70 | 75 |
| Stress at 300% strain, MPa | 13.5 | 13.7 | 14.1 | 13.7 | 14.2 |
| Ultimate tensile strength, MPa | 26.3 | 24.4 | 23.2 | 22.8 | 22.3 |
| Ultimate elongation, % | 505 | 466 | 443 | 442 | 422 |

TABLE X

| | 4-VP1A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° t5, min. | 28.5 | 28.5 | 28.0 | 26.5 | 26.0 |
| Oscil. Disc Rheometer data at 153° | | | | | |
| Rmax, Nm | 3.90 | 3.95 | 3.93 | 3.95 | 3.95 |
| Rmin, Nm | 0.59 | 0.59 | 0.59 | 0.59 | 0.61 |
| t90 | 27.7 | 25.0 | 23.7 | 22.3 | 19.3 |
| t25 | 16.4 | 15.7 | 15.0 | 14.6 | 13.0 |
| t2 | 13.2 | 12.6 | 12.1 | 12.0 | 10.7 |
| t90-t2 | 14.5 | 12.4 | 11.6 | 10.3 | 8.6 |
| t25-t2 | 3.2 | 3.1 | 2.9 | 2.6 | 2.3 |
| k2, min.-1 | 0.181 | 0.231 | 0.252 | 0.287 | 0.347 |
| t2/t25 | 0.804 | 0.802 | 0.806 | 0.821 | 0.823 |
| Stress-strain data, cured at 153° C. to Rmax (unaged) | | | | | |
| Shore A hardness | 65 | 66 | 67 | 67 | 67 |
| Stress at 300% strain, MPa | 13.0 | 13.1 | 13.5 | 13.4 | 13.5 |
| Ultimate tensile strength, MPa | 23.2 | 24.0 | 23.7 | 20.8 | 21.7 |
| Ultimate elongation, % | 459 | 471 | 457 | 415 | 427 |

TABLE XI

| | 4-VP2 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° t5, min. | 29.5 | 26.0 | 24.4 | 21.0 | 17.2 |
| Oscil. Disc Rheometer data at 153° | | | | | |
| Rmax, Nm | 3.96 | 4.13 | 4.15 | 4.25 | 4.25 |
| Rmin, Nm | 0.56 | 0.62 | 0.61 | 0.64 | 0.70 |
| t90 | 27.8 | 23.2 | 21.3 | 18.2 | 16.2 |
| t25 | 16.2 | 14.2 | 13.5 | 11.6 | 10.2 |
| t2 | 12.8 | 11.3 | 10.8 | 9.5 | 8.0 |
| t90-t2 | 15.0 | 11.9 | 10.5 | 8.7 | 8.2 |
| t25-t2 | 3.4 | 2.9 | 2.7 | 2.1 | 2.2 |
| k2, min.-1 | 0.177 | 0.238 | 0.268 | 0.333 | 0.362 |
| t2/t25 | 0.790 | 0.795 | 0.8 | 0.818 | 0.784 |
| Stress-strain data, cured at 153° C. to Rmax (unaged) | | | | | |
| Shore A hardness | 66 | 69 | 70 | 73 | 78 |
| Stress at 300% strain, MPa | 13.5 | 15.0 | 15.1 | 15.3 | 15.9 |
| Ultimate tensile strength, MPa | 26.3 | 24.4 | 24.8 | 23.5 | 22.5 |
| Ultimate elongation, % | 505 | 441 | 441 | 423 | 405 |

TABLE XII

| | 4-VP3 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° t5, min. | 29.0 | 26.0 | 23.5 | 20.4 | 16.5 |
| Oscil. Disc Rheometer data at 153° | | | | | |
| Rmax, Nm | 3.92 | 4.05 | 4.11 | 4.22 | 4.15 |
| Rmin, Nm | 0.59 | 0.60 | 0.52 | 0.63 | 0.65 |
| t90 | 26.5 | 22.8 | 20.3 | 17.7 | 16.2 |
| t25 | 15.8 | 14.0 | 12.5 | 11.2 | 10.1 |
| t2 | 12.5 | 11.3 | 10.2 | 9.0 | 7.5 |
| t90-t2 | 14.0 | 11.5 | 10.1 | 8.7 | 8.7 |
| t25-t2 | 3.3 | 2.7 | 2.3 | 2.2 | 2.6 |
| k2, min.-1 | 0.185 | 0.238 | 0.268 | 0.333 | 0.378 |
| t2/t25 | 0.791 | 0.807 | 0.816 | 0.803 | 0.742 |
| Stress-strain data, cured at 153° C. to Rmax (unaged) | | | | | |

TABLE XII-continued

|  | 4-VP3 | | | | |
|---|---|---|---|---|---|
| Shore A hardness | 67 | 68 | 69 | 73 | 78 |
| Stress at 300% strain, MPa | 13.4 | 14.2 | 14.7 | 15.2 | 15.3 |
| Ultimate tensile strength, MPa | 25.9 | 25.6 | 24.7 | 23.7 | 23.5 |
| Ultimate elongation, % | 502 | 476 | 446 | 439 | 436 |

TABLE XIII

|  | 4-VP4 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex ® 13 antidegradant | 2.0 | 2.0 | 2.0 | 2.0 | 2.0 |
| Santocure ® NS accelerator | 1.2 | 1.2 | 1.2 | 1.2 | 1.2 |
| Sulfur | 2.0 | 2.0 | 2.0 | 2.0 | 2.0 |
| Mooney scorch 135° t5, min. | 28.5 | 29.5 | 26.5 | 24.4 | 20.0 |
| Oscil. Disc Rheometer data at 153° | | | | | |
| Rmax, Nm | 3.92 | 3.92 | 3.94 | 3.91 | 3.94 |
| Rmin, Nm | 0.62 | 0.63 | 0.63 | 0.63 | 0.65 |
| t90 | 26.5 | 25.9 | 25.0 | 24.5 | 20.5 |
| t25 | 15.4 | 15.0 | 14.4 | 14.0 | 11.6 |
| t2 | 12.2 | 12.0 | 11.5 | 10.9 | 9.3 |
| t90-t2 | 14.3 | 13.9 | 13.5 | 13.6 | 11.2 |
| t25-t2 | 3.2 | 3.0 | 2.9 | 3.1 | 2.3 |
| k2, min.-1 | 0.185 | 0.189 | 0.198 | 0.208 | 0.245 |
| t2/t25 | 0.792 | 0.8 | 0.798 | 0.778 | 0.801 |
| Stress-strain data, cured at 153° C. to Rmax (unaged) | | | | | |
| Shore A hardness | 65 | 65 | 67 | 70 | 72 |
| Stress at 300% strain, MPa | 12.6 | 12.9 | 12.9 | 12.2 | 12.9 |
| Ultimate tensile strength, MPa | 22.3 | 21.5 | 20.9 | 19.4 | 17.2 |
| Ultimate elongation, % | 459 | 439 | 443 | 419 | 373 |

As the vinylpyridine content of the copolymer increases, the cure-activation effect of the pyridyl moiety would be expected to continuously increase since there would be more and more of it. However, after a vinylpyridine content of greater than 50% is reached, there is a reduced effect on the vulcanization rate. This could be between the vinylpyridine copolymer and SBR. Regardless of the reason, substantial increases in cure rates can be obtained when the vinylpyridine content of the activator is between 20 and 65%, with the greatest effects being obtained when the vinylpyridine content is between 35 and 50%.

The cure-rate activating effects of the copolymers prepared from 2-vinylpyridine are generally somewhat greater than those from 4-vinylpyridine; however, the copolymers prepared from 4-vinylpyridine appear to be somewhat more scorch activating, especially when the higher levels of the activators are used.

The effects of the additives on cure rate are greater at higher levels of loading or usage. Substantial effects are obtained at all levels of loading shown in the data. However, the higher levels might be less appropriate for some applications since higher levels of loading might give somewhat hysteretic stocks. In such cases, maximum levels of usage of the additives might be limited to 1-2 or 3 phr.

The final state of cure, as indicated by Rmax, is almost insensitive to the concentration of the polymeric activator. Provided that 1.0 phr or less of the activator is used, scorch resistance is reduced by only about 3-4%, whereas the rate of crosslink formation during vulcanization can be increased by about 60%. At an activator level of 2.0 phr, the scorch resistance is still only reduced by about 10% but the crosslink formation can be increased by over 80%. Even at an activator usage level of 4.0 phr, scorch resistance is reduced by less than 20%, but the rate of crosslink formation can be increased by about 130%. The inverse cure-rate index t90-t2 is correspondingly reduced by 29%, 41% or 52% when 1.0 phr, 2.0 phr, or 4.0 phr of the activator is used. The results are similar, though not as dramatic for the inverse early cure-rate index t25-t2.

NATURAL RUBBER/SYNTHETIC RUBBER BLENDS

It is a further aspect of the present invention to use the above-noted one or more butadiene-based synthetic rubbers, unfilled or containing from about 0.1 to about 120 parts by weight and desirably from about 20 to about 80 parts by weight of carbon black per 100 parts by weight of rubber, in a blend with natural or synthetic-isoprene rubber. The amount of the isoprene rubber is generally up to about 70 percent by weight and desirably from about to about 50 percent by weight based upon the total weight of the butadiene and isoprene rubbers. Thus, in lieu of the abovenoted butadiene rubbers, one or more of the butadiene-based synthetic rubbers is blended with natural or synthetic isoprene rubber. The amount of the interpolymer co-activator is from about 0.1 to about 5.0 parts by weight, desirably from about 0.2 to about 2.5 parts by weight, and preferably from about 0.3 to about 1.5 parts by weight per 100 parts by weight of rubber.

The use of natural rubber-synthetic rubber blends will be better understood by reference to the following examples.

A natural rubber-butadiene rubber masterbatch (40/60%) had the following recipe.

| SMR-5CV | 60.0 |
|---|---|
| BR 1203 | 40.0 |
| N-339 Black | 55.0 |
| Sundex 8125 | 5.0 |
| Zinc oxide | 3.0 |
| Stearic acid | 2.0 |
| Santoflex ® 13 | 2.0 |
| Sunolite 240 | 1.5 |

The above masterbatch was utilized with various amounts of the co-activator of the present invention as set forth in Tables XVI through XIX. Preparation including mixing and compounding of the various ingredients was carried out in a conventional manner.

TABLE XIV

|  | 1 | 2 | 3 | 4 | 5 |
|---|---|---|---|---|---|
| Masterbatch NR/BR Truck Tire Tread (high cis BR) | 168.5 | 168.5 | 168.5 | 168.5 | 168.5 |
| Sulfur | 2.0 | 2.0 | 2.0 | 2.0 | 2.0 |
| Santocure ® NS | 1.0 | 1.0 | 1.0 | 1.0 | 1.0 |
| 2-VP-co-B | — | 0.75 | 1.0 | 1.5 | 2.0 |
| Mooney Scorch 121° C. | | | | | |
| t5, minutes | 30.1 | 28.5 | 28.1 | 27.6 | 26.9 |
| Minimum viscosity | 53.1 | 55.0 | 52. | 52.9 | 53.0 |
| ODR Data at 144° C. | | | | | |

TABLE XIV-continued

| | 1 | 2 | 3 | 4 | 5 |
|---|---|---|---|---|---|
| Rmax, Nm | 4.84 | 4.90 | 4.89 | 4.84 | 4.79 |
| Rmin, Nm | 0.96 | 0.97 | 0.96 | 0.97 | 0.99 |
| t90, minutes | 19.7 | 17.5 | 17.0 | 17.0 | 16.3 |
| t2 | 10.7 | 10.2 | 9.8 | 9.8 | 9.5 |
| t90 − t2, minutes | 9.0 | 7.3 | 7.2 | 7.2 | 6.8 |
| t25, minutes | 13.2 | 12.0 | 11.5 | 11.5 | 11.2 |
| t25 − t2, minutes | 2.5 | 1.8 | 1.7 | 1.7 | 1.7 |
| Max veloc of vulc, %/min. | 20.6 | 26.4 | 27.3 | 27.8 | 28.3 |
| Stress-Strain Data Rmax Cure at 144° C. | | | | | |
| Tensile, MPa | 28.66 | 29.58 | 28.34 | 28.59 | 27.23 |
| 100% Modulus, MPa | 4.10 | 4.43 | 4.41 | 4.43 | 4.23 |
| 300% Modulus, MPa | 19.93 | 19.83 | 19.57 | 19.05 | 18.57 |
| % Elongation | 416 | 429 | 420 | 429 | 421 |
| Shore A | 70 | 72 | 73 | 73 | 74 |

As apparent from Table XIV, large improvements (reductions) in t90-t2 as well as t25-t2 values were obtained utilizing the co-activator of the present invention.

Table XV relates to a blend utilizing 30 percent by weight of natural rubber and 70 percent by weight of butadiene-based synthetic rubber. The masterbatch recipe is as follows.

| MASTERBATCH SBR/BR/HR phr | |
|---|---|
| Solflex 1216 | 50.0 |
| BR 1203 | 20.0 |
| SMR5 | 30.0 |
| N-339 Black | 50.0 |
| Sundex 8125 | 8.0 |
| Zinc oxide | 5.0 |
| Stearic acid | 3.0 |
| Santoflex ® 13 | 2.0 |

Blends were made and tested in a manner as described hereinabove and the data obtained therefrom are set forth in Table XV.

TABLE XV

| | 1 | 2 | 3 | 4 | 5 |
|---|---|---|---|---|---|
| Masterbatch SBR/BR/NR | 168.0 | 168.0 | 168.0 | 168.0 | 168.0 |
| OE Passenger Tread (soln hi vinyl SBR; high cis BR) #2 | | | | | |
| Insoluble Sulfur | 1.75 | 1.75 | 1.75 | 1.75 | 1.75 |
| Santocure ® NS | 1.5 | 1.5 | 1.5 | 1.5 | 1.5 |
| 2-VP-co-B | — | 0.75 | 1.0 | 1.5 | 2.0 |
| Mooney Scorch 121° C. | | | | | |
| t5, minutes | 44.2 | 35.9 | 33.6 | 33.4 | 31.5 |
| Minimum viscosity | 55.5 | 57.0 | 57.0 | 56.0 | 56.1 |
| ODR Data at 160° C. | | | | | |
| Rmax, Nm | 4.34 | 4.43 | 4.32 | 4.26 | 4.23 |
| Rmin, Nm | 0.82 | 0.84 | 0.83 | 0.83 | 0.83 |
| t90, minutes | 9.8 | 8.3 | 8.0 | 7.7 | 7.3 |
| t2 | 5.2 | 5.0 | 4.8 | 4.7 | 4.5 |
| t90 − t2, minutes | 4.6 | 3.3 | 3.2 | 3.0 | 2.8 |
| t25, minutes | 6.7 | 6.2 | 5.8 | 5.7 | 5.5 |
| t25 − t2, minutes | 1.5 | 1.2 | 1.0 | 1.0 | 1.0 |
| Max veloc of vulc., %/min. | 32.3 | 45.7 | 47.4 | 51.2 | 52.9 |
| Stress-Strain Data Rmax Cure at 160° C. | | | | | |
| Tensile, MPa | 24.06 | 23.75 | 24.10 | 23.91 | 22.93 |
| 100% Modulus, MPa | 3.30 | 3.34 | 3.26 | 3.36 | 3.35 |
| 300% Modulus, MPa | 16.54 | 15.92 | 15.24 | 15.26 | 15.15 |
| % Elongation | 407 | 413 | 420 | 432 | 420 |

TABLE XV-continued

| | 1 | 2 | 3 | 4 | 5 |
|---|---|---|---|---|---|
| Shore A | 68 | 70 | 70 | 70 | 71 |

As apparent from the above data, once again good cure rates were achieved utilizing the co-activator of the present invention along with good property retention.

Table XVI also relates to a 50 percent blend of natural rubber and butadiene rubber wherein the masterbatch had the following recipe.

| MASTERBATCH BR/NR phr | |
|---|---|
| SMR-CV-50 | 50.0 |
| BR 1203 | 50.0 |
| Renacit 7 | 0.25 |
| N-330 Black | 20.0 |
| N-550 Black | 20.0 |
| Stearic acid | 1.0 |
| Zinc oxide | 3.0 |
| Sundex 8125 | 4.0 |
| Picco 6000 resin | 6.0 |
| Sunolite 240 | 2.5 |
| Santoflex ® 13 | 3.0 |
| | 159.75 |

When tested according to the following recipes, the results of Table XVI were achieved.

TABLE XVI

| | 1 | 2 | 3 | 4 |
|---|---|---|---|---|
| Masterbatch NR/BR | 159.75 | 159.75 | 159.75 | 159.75 |
| Sidewall compound (high cis BR) | | | | |
| Insoluble Sulfur | 2.0 | 2.0 | 2.0 | 2.0 |
| Santocure ® NS | 1.0 | 1.0 | 1.0 | 1.0 |
| Santogard PVI | — | — | — | — |
| 2-Vinylpyridine-co-butadiene (36.4% vinylpyridine content) | — | 0.5 | 1.0 | 2.0 |
| Mooney Scorch 121° C. | | | | |
| t5, minutes | 55.5 | 49.0 | 45.0 | 40.0 |
| Minimum viscosity | 23.0 | 24.0 | 25.0 | 24.9 |
| ODR Data at 160° C. | | | | |
| Rmax, Nm | 3.35 | 3.49 | 3.45 | 3.33 |
| Rmin, Nm | 0.44 | 0.42 | 0.44 | 0.45 |
| t90, minutes | 8.3 | 7.4 | 6.6 | 6.2 |
| t2, minutes | 5.1 | 4.8 | 4.6 | 4.3 |
| t90 − t2, minutes | 3.2 | 2.6 | 2.0 | 1.9 |
| t25, minutes | 6.4 | 5.7 | 5.4 | 5.0 |
| t25 − t2, minutes | 1.3 | 0.9 | 0.8 | 0.7 |
| Max veloc of vulc/%/min | 52.3 | 79.2 | 85.5 | 98.0 |
| Stress-Strain Data Optimum Cure at 160° C. (to Rmax) | | | | |
| Tensile, MPa | 24.45 | 24.39 | 24.66 | 24.10 |
| 100% Modulus, MPa | 1.86 | 2.03 | 2.08 | 2.08 |
| 300% Modulus, MPa | 8.67 | 9.22 | 8.92 | 8.41 |
| % Elongation | 617 | 588 | 607 | 630 |
| Shore A | 57 | 59 | 58 | 60 |

As apparent from Table XVI, dramatic reductions and cure times were achieved along with good retention of various physical properties.

SILICA-FILLED RUBBER

The presence of the interpolymer co-activator of the present invention improves the vulcanization behavior of various rubbers which contain silica as a filler. The amount of silica is generally from about 10–15 to about 100 parts by weight, desirably from about 20 to about 80 parts by weight, and preferably from about 30 to about 70 parts by weight per 100 parts by weight of total rubber. The silica-containing rubber composition includes one or more of the butadiene-based synthetic rubbers, or natural or synthetic isoprene rubber, as well as blends thereof. The one or more butadiene-based synthetic rubbers are the same as set forth hereinabove such as a butadiene homopolymer, or copolymers made from 1,3-butadiene and a vinyl aromatic comonomer having from 8 to 12 carbon atoms such as styrene, alphamethylstyrene, and the like. Natural isoprene rubber, that is isoprene rubber derived from trees or shrubs generally grown in the tropical or hot portions of the world, contains predominantly CIS-1,4 microstructure, and can be utilized by itself. Synthetic isoprene rubber, that is, isoprene rubber made synthetically and also containing predominantly CIS-14 microstructure, can also be utilized by itself.

The amount of sulfur utilized with the one or more butadiene-based rubbers, natural or synthetic isoprene rubber, or blends thereof, is the same as set forth hereinabove, that is, from about 0.2 to about .4 parts by weight per 100 parts by weight of rubber polymer.

The vulcanization accelerators used in the compositions of the present invention containing silica or blends of silica and carbon black or other fillers are the same as set forth hereinabove and thus include the various thiazoles, the various sulfenamides, the various guanidines, the various thioureas, the various thurams, the various xanthates, the various dithiocarbamates, and the amount of such an accelerator is generally from about 0.1 to about 5 parts by weight, desirably from about 0.2 to about 2.5 parts by weight, and preferably from about 0.25 to about 2.0 parts by weight per 100 parts by weight of the rubber polymer or polymer blends.

The co-activator of the present invention is as set forth hereinabove, that is an interpolymer comprising units derived from a vinylpyridine monomer and from a diene hydrocarbon comonomer, but in which the amount of vinylpyridine-derived units is from about 5 or 10 percent to about 75 percent by weight, desirably from about 20 to about 65 percent by weight, and preferably from about 30 to about 55 percent by weight. These specific types of vinylpyridine monomers as well as diene hydrocarbon monomers are the same as set forth hereinabove with 2-vinylpyridine and 1,3-butadiene being especially preferred. The interpolymer co-activator can include other co-monomers such as styrene in small amounts as from about 0.1 to about 30 percent by weight of the total weight of the co-activator. The amount of the interpolymer co-activators is generally from about 0.1 to about 5 parts by weight, desirably from about 0.2 to about 2.5 parts by weight, preferably from about 0.3 to about 2.0 parts by weight per 100 parts by weight of the rubber polymers containing silica therein.

The rubber composition of the present invention containing a silica filler can contain typical compounding ingredients in conventional amounts known to the art as well as in the literature and include various antidegradants, such as p-phenylenediamines, quinolines, phenolics, etc., various extender oils such as aromatic, for example, naphthenic, or paraffinic, in amounts up to about 200 phr; various other fillers such as clay, calcium carbonate, talc, etc., and especially carbon black in amounts up to about 80 phr; various activators such as zinc oxide, stearic acid; and the like.

The rubber compositions of the present invention can be used in a large number of applications including tires, especially in the tread and shoulder portions thereof.

The invention will be better understood by reference to the following examples in which all concentrations are expressed as parts are by weight and all temperatures are in degrees Celsius, unless otherwise specified.

The following masterbatches were prepared.

| MASTERBATCH A | phr | MASTERBATCH AA | phr |
|---|---|---|---|
| SMR CV | 100.0 | SMR CV | 100.0 |
| HiSil 233 | 50.0 | HiSil 233 | 50.0 |
| Circosol 4240 | 5.0 | Circosol 4240 | 5.0 |
| Zinc oxide | 5.0 | Zinc oxide | 5.0 |
| Stearic acid | 2.0 | Stearic acid | 2.0 |
|  | 162.0 | 2-Vinylpyridine-co-butadiene | 4.0 |
|  |  |  | 166.0 |
| MASTERBATCH B | phr | MASTERBATCH BB | phr |
| SBR 1500 | 100.0 | SBR 1500 | 100.0 |
| HiSil 233 | 50.0 | HiSil 233 | 50.0 |
| Circosol 4240 | 10.0 | Circosol 4240 | 10.0 |
| Zinc oxide | 4.0 | Zinc oxide | 4.0 |
| Stearic acid | 2.0 | Stearic acid | 2.0 |
|  | 166.0 | 2-Vinypyridine-co-butadiene | 4.0 |
|  |  |  | 170.0 |

The SMR CV set forth in masterbatches A and AA is a standard grade of Malasia natural rubber and the SBR 1500 set forth in masterbatches B and BB is a cold-process, non-pigmented styrene butadiene rubber containing 23.5 percent target bound styrene.

Interpolymers of 1,3-butadiene with 2-vinylpyridine are prepared by emulsion polymerization according to a procedure similar to that given by W. B. Reynolds, J. E. Prichard, M. H. Opheim, and G. Kraus, *Rubber Chemistry and Technology*, 30, 338 (1948). The amount of 2-vinylpyridine units is 36.4 percent by weight. The vinylpyridine interpolymer was blended into a silica-filled masterbatch of either natural rubber or SBR rubber at the concentrations indicated in the Tables below. The abbreviation "phr" means parts by weight per hundred parts by weight of rubber. Control compositions, i.e. masterbatch A and masterbatch B, each containing no vinylpyridine copolymer, were also prepared. The masterbatches were prepared by standard procedures in a Banbury mixer. The curatives and 2.0 phr of N-1, 3-dimethylbutyl-dimethyl-N'-phenyl-p-phenylenediamine antidegradant (SANTOFLEX ® 13) we re added on a roll mill. Tests of the compositions were in accordance with the appropriate ASTM procedures for rubber. The accelerator was N-t-butyl-benzothiazylsulfenamide, that is, SANTOCURE ® NS. Vulcanization characteristics were determined by using the Mooney viscometer at 135° and the Monsanto Oscillating Disc Rheometer (ODR) at 153°. The definitions of various terms were as set forth hereinabove as with regard to "Mooney Scorch", Rmn, Rmx Maximum Velocity of Vulcanization, and the like.

It can be seen that the presence of 0.25 to 4.0 phr of a vinylpyridine-butadiene interpolymer only slightly affects the mechanical properties of silica-filled SBR vulcanizates. Even the effects of 4.0 phr of a vinylpyridine interpolymer are not very large. The effect of the vinylpyridine copolymer activators and silica on the vulcanization characteristics is of primary importance.

TABLE XVII

|  | (SBR Control) 1 | 2 | 3 | (N.R. Control) 4 | 5 | 6 |
|---|---|---|---|---|---|---|
| Masterbatch B (SBR; silica; 0 phr 2-VP-co-B) | 166.0 | 83.0 | — | — | — | — |
| Masterbatch BB (SBR; silica; 4 phr 2-VP-co-B) | — | 85.0 | 170.0 | — | — | — |
| Masterbatch A (NR; silica; 0 phr 2-VP-co-B) | — | — | — | 162.0 | 81.0 | — |
| Masterbatch AA (NR; silica; 4 phr 2-VP-co-B) | — | — | — | — | 83.0 | 166.0 |
| phr of 2-vinylpyridine | 0 | 2.0 | 4.0 | 0 | 2.0 | 4.0 |
| Sulfur | 2.0 | 2.0 | 2.0 | 2.5 | 2.5 | 2.5 |
| Santoflex 13 | 2.0 | 2.0 | 2.0 | 2.0 | 2.0 | 2.0 |
| Santocure NS | 1.2 | 1.2 | 1.2 | 0.6 | 0.6 | 0.6 |
| Mooney Scorch, 121° C. | | | | | | |
| t5, minutes | 149.0 | 75.1 | 74.5 | 50.0 | 35.6 | 45.5 |
| Minimum viscosity | 39.8 | 38.0 | 39.8 | 59.8 | 42.0 | 30.2 |
| ODR Data at 153° C. | | | | | | |
| Rmax, Nm | 2.60 | 2.43 | 2.15 | 4.46 | 3.08 | 2.16 |
| Rmin, Nm | 0.60 | 0.63 | 0.62 | 1.95 | 1.36 | 0.85 |
| t90, minutes | 72.4 | 31.6 | 23.0 | 80.0 | 27.3 | 20.0 |
| t2, minutes | 21.6 | 15.0 | 13.1 | 5.5 | 6.0 | 7.0 |
| t90 − t2, minutes | 50.8 | 16.6 | 9.9 | 74.5 | 21.3 | 13.0 |
| t25, minutes | 27.1 | 16.0 | 13.6 | 12.0 | 7.0 | 7.3 |
| t25 − t2, minutes | 5.5 | 1.0 | 0.5 | 6.5 | 1.0 | 0.3 |
| Max veloc. of vulc., %/min | 2.8 | 12.3 | 20.1 | 2.8 | 16.0 | 10.5 |

TABLE XVIII

|  | 1 | 2 | 3 | 4 | 5 | 6 |
|---|---|---|---|---|---|---|
| Masterbatch B (SBR; silica; 0 phr 2-VP-co-B) | 166.0 | 83.0 | — | — | — | — |
| Masterbatch BB (SBR; silica; 4 phr 2-VP-co-B) | — | 85.0 | 170.0 | — | — | — |
| Masterbatch A (NR; silica; 0 phr 2-VP-co-B) | — | — | — | 162.0 | 81.0 | — |
| Masterbatch AA (NR; silica; 4 phr 2-VP-co-B) | — | — | — | — | 83.0 | 166.0 |
| Parts of 2-vinylpyridine | 0.0 | 2.0 | 4.0 | 0.0 | 2.0 | 4.0 |
| Sulfur | 2.0 | 2.0 | 2.0 | 2.5 | 2.5 | 2.5 |
| Santoflex 13 | 2.0 | 2.0 | 2.0 | 2.0 | 2.0 | 2.0 |
| Santocure NS | 1.2 | 1.2 | 1.2 | 0.6 | 0.6 | 0.6 |
| Stress-Strain Data Optimum Cure at 153° C. (to Rmax) | | | | | | |
| Tensile Strength, MPa | 18.16 | 19.86 | 16.44 | 14.24 | 12.11 | 11.71 |
| 100% Modulus, MPa | 1.01 | 1.03 | 1.03 | 1.03 | 0.79 | 0.76 |
| 300% Modulus, MPa | 2.12 | 2.03 | 2.03 | 2.59 | 2.49 | 2.12 |
| % Elongation | 869 | 914 | 912 | 700 | 654 | 700 |
| Shore A | 53 | 52 | 51 | 60 | 47 | 42 |

TABLE XIX

|  | (SBR Control) 1 | 2 | 3 | 4 | 5 | (Natural Rubber Control) 6 | 7 | 8 | 9 | 10 |
|---|---|---|---|---|---|---|---|---|---|---|
| Masterbatch B (SBR with silica) | 166.0 | 166.0 | 166.0 | 166.0 | 166.0 | — | — | — | — | — |
| Masterbatch A (NR with silica) | — | — | — | — | — | 162.0 | 162.0 | 162.0 | 162.0 | 162.0 |
| 2-Vinylpyridine-co-butadiene (IO 36.4% vinylpyridine content) | — | 0.25 | 0.5 | 1.0 | 2.0 | — | 0.25 | 0.5 | 1.0 | 2.0 |
| Sulfur | 2.0 | 2.0 | 2.0 | 2.0 | 2.0 | 2.5 | 2.5 | 2.5 | 2.5 | 2.5 |
| Santoflex 13 | 2.0 | 2.0 | 2.0 | 2.0 | 2.0 | 2.0 | 2.0 | 2.0 | 2.0 | 2.0 |
| Santocure NS | 1.2 | 1.2 | 1.2 | 1.2 | 1.2 | 0.6 | 0.6 | 0.6 | 0.6 | 0.6 |
| Mooney Scorch, 121° C. | | | | | | | | | | |
| t5, minutes | 143.0 | 125.5 | 121.0 | 109.0 | 81.1 | 33.5 | 35.6 | 36.0 | 34.5 | 35.0 |
| Minimum viscosity | 37.1 | 36.9 | 37.1 | 37.1 | 41.0 | 34.1 | 30.9 | 29.1 | 28.5 | 25.0 |
| ODR Data at 153° C. | | | | | | | | | | |
| Rmax, Nm | 3.01 | 3.06 | 3.07 | 3.13 | 3.03 | 4.53 | 4.33 | 4.28 | 4.02 | 3.77 |
| Rmin, Nm | 0.64 | 0.66 | 0.66 | 0.71 | 0.76 | 1.99 | 1.86 | 1.86 | 1.81 | 1.66 |
| t90, minutes | 49.3 | 39.5 | 35.0 | 30.8 | 27.7 | 36.3 | 24.5 | 23.0 | 16.0 | 13.0 |
| t2, minutes | 23.8 | 21.5 | 20.0 | 18.3 | 17.2 | 6.7 | 6.6 | 6.5 | 6.6 | 6.6 |
| t90 − t2, minutes | 25.5 | 18.0 | 15.0 | 12.5 | 10.5 | 29.6 | 17.9 | 16.5 | 9.4 | 6.4 |
| t25, minutes | 28.3 | 24.3 | 22.2 | 20.3 | 18.5 | 8.3 | 7.8 | 7.5 | 7.3 | 7.2 |
| t25 − t2, minutes | 4.5 | 2.8 | 2.2 | 2.0 | 1.3 | 1.6 | 1.2 | 1.0 | 0.7 | 0.6 |
| Max veloc. of vulc., % min. | 5.5 | 9.8 | 11.3 | 13.4 | 15.6 | 13.9 | 16.1 | 18.9 | 26.1 | 30.1 |

TABLE XX

|  | 1 | 2 | 3 | 4 | 5 | 6 |
|---|---|---|---|---|---|---|
| Masterbatch B (SBR; silica) | 164.0 | 123.0 | 82.0 | — | 82.0 | — |
| Masterbatch BB (SBR; silica; 2 phr 2-VP-co-B) | — | 41.5 | 83.0 | 166.0 | — | — |
| phr of 2-VP-co-B | 0.0 | 0.5 | 1.0 | 2.0 | 0.0 | 0.0 |
| Masterbatch D (SBR; silica; 2 phr PE glycol) | — | — | — | — | 83.0 | 166.0 |
| Sulfur | 2.0 | 2.0 | 2.0 | 2.0 | 2.0 | 2.0 |
| Zinc Oxide | 4.0 | 4.0 | 4.0 | 4.0 | 4.0 | 4.0 |
| Santocure NS | 1.2 | 1.2 | 1.2 | 1.2 | 1.2 | 1.2 |
| 2-VP-co-B | 0.0 | 0.5 | 1.0 | 2.0 | — | — |
| Polyethylene glycol | — | — | — | — | 1.0 | 2.0 |
| Mooney Scorch, 121° C. | | | | | | |
| t5, minutes | 117.6 | 50.0 | 40.4 | 41.5 | 75.0 | 61.5 |
| ODR Data at 153° C. | | | | | | |
| Rmax, Nm | 4.36 | 4.41 | 4.39 | 4.12 | 4.57 | 4.54 |
| Rmin, Nm | 1.52 | 1.55 | 1.55 | 1.46 | 1.39 | 1.32 |
| t90, minutes | 56.8 | 35.0 | 30.8 | 60.9 | 35.2 | 30.8 |
| t2, minutes | 13.5 | 9.0 | 8.5 | 9.0 | 12.7 | 13.5 |
| t90 − t2, minutes | 43.3 | 26.0 | 22.3 | 51.9 | 22.5 | 17.3 |
| t25, minutes | 19.5 | 11.3 | 10.5 | 11.2 | 15.8 | 16.3 |
| t25 − t2, minutes | 6.0 | 2.3 | 2.0 | 2.2 | 3.1 | 2.8 |
| Max veloc. of vulc, % min. | 3.2 | 8.2 | 9.5 | 9.6 | 6.4 | 9.0 |
| Stress-Strain Data Optimum Cure at 153° C. (to Rmax) | | | | | | |
| Tensile Strength, MPa | 24.79 | 25.42 | 24.04 | 22.25 | 26.38 | 27.80 |
| 100% Modulus, MPa | 1.32 | 1.40 | 1.52 | 1.41 | 1.53 | 1.45 |
| 300% Modulus, MPa | 3.87 | 4.36 | 4.50 | 4.19 | 4.64 | 4.36 |
| % Elongation | 799 | 753 | 749 | 762 | 744 | 749 |
| Shore A | 63 | 62 | 62 | 65 | 66 | 65 |

In Table XX, Masterbatch B was the same as set forth hereinabove with regard to Tables XVII–XIX except that the styrene-butadiene rubber was type "1502" and also contained 2.0 parts by weight of SANTOFLEX® 13 therein. In Table XX, Masterbatch BB was the same as Masterbatch BB in Tables XVII–XIX except that SBR 1502 was utilized along with 2.0 parts of SANTOFLEX® 13.

Masterbatch D had the following formulation:

| MASTERBATCH D | phr |
|---|---|
| SBR 1502 | 100.0 |
| HiSil 233 | 50.0 |
| Circosol 4240 | 10.0 |
| Stearic acid | 2.0 |
| Santoflex® 13 | 2.0 |
| Carbowax 400 | 2.0 |
| | 166.0 |

Carbowax 400 is polyethylene glycol (mol. wt. approx. 400).

As apparent from the Tables, cure rates were dramatically increased by the action of the co-activator in both natural rubber and synthetic rubber compositions. Additionally, Table XX shows that Carbowax 400, a competitive material, is not as efficient as the co-activator of the present invention. That is, even ½ of the amount of the co-activator of the present invention yielded results as good as and eve better than twice the amount of Carbowax 400.

While in accordance with the Patent Statutes, the best mode and preferred embodiment has been set forth, the scope of the invention is not limited thereto, but rather by the scope of the attached claims.

What is claimed is:

1. A vulcanizable rubber composition, comprising:
   (A) an uncured natural or synthetic isoprene rubber, or one or more uncured butadiene based synthetic rubbers, or uncured blends thereof, said uncured rubbers being sulfur vulcanizable, (B) a silica filler, (C) sulfur, (D) an organic accelerator, and (E) a vinylpyridine-butadiene interpolymer co-activator, said interpolymer co activator (E) containing from about 20 percent to about 65 percent by weight of vinylpyridine units, the amount of said vinylpyridine-butadiene copolymer co-activator being from about 0.5 to 2 parts by weight per 100 parts by weight of said rubber.

2. A vulcanizable rubber composition according to claim 1, wherein the amount of said sulfur (C) is from about 0.2 to about 4.0 parts by weight per 100 parts by weight of said rubber, and wherein the amount of said organic accelerator (D) is from about 0.1 to about 5.0 parts by weight per 100 parts by weight of said rubber.

3. A vulcanizable rubber composition according to claim 2, wherein the amount of said silica (B) is from about 10 to about 100 parts by weight per 100 parts by weight of said rubber.

4. A vulcanizable rubber composition according to claim 3, wherein said vinylpyridine monomer is 2-vinylpyridine, 4-vinylpyridine, or 2-methyl-5-vinylpyridine, and wherein said diene hydrocarbon monomer is 1,3-butadiene.

5. A vulcanizable rubber composition according to claim 4, wherein the amount of said silica (B) is from about 20 to about 80 parts by weight per 100 parts by weight of said rubber.

6. A vulcanizable rubber composition according to claim 5, wherein said vinyl pyridine monomer is 2-vinylpyridine, and wherein the amount of said organic accelerator (D) is from about 0.2 to about 2.5 parts by weight per 100 parts by weight of said rubber.

7. A vulcanizable rubber composition according to claim 6, wherein the amount of said silica (B) is from about 30 to about 70 parts by weight per 100 parts by weight of said rubber, and wherein said interpolymer co-activator (E) contains from about 30 percent to about 55 percent by weight of vinylpyridine units.

8. A vulcanizable rubber composition according to claim 3, wherein said synthetic rubber is a styrene butadiene rubber or a butadiene rubber.

9. A vulcanizable rubber composition according to claim 5, wherein said synthetic rubber is a styrene butadiene rubber or a butadiene rubber.

10. A vulcanizable rubber composition according to claim 7, wherein said synthetic rubber is a styrene butadiene rubber or a butadiene rubber.

11. A vulcanized rubber comprising the cured product of claim 1.

12. A vulcanized rubber comprising the cured product of claim 5.

13. A vulcanized rubber comprising the cured product of claim 10.

14. A vulcanizable rubber composition, comprising:
(A) an uncured blend comprising a one or more synthetic butadiene-based rubbers and up to about 70 percent by weight of natural or synthetic isoprene rubber, said uncured rubbers being sulfur vulcanizable, (C) sulfur, (D) an organic accelerator, and (E) a vinylpyridine-butadiene interpolymer co-activator, said interpolymer co-activator (E) containing from about 20 percent to about 65 percent by weight of vinylpyridine units, the amount of said vinylpyridine-butadiene copolymer co-activator (E) being from about 0.5 to 2 parts by weight per 100 parts by weight of said rubber.

15. A vulcanizable rubber composition according to claim 14, including (F) a carbon black filler, wherein the amount of said carbon black filler (F) is from about 0.1 to about b 120 parts by weight per 100 parts by weight of said rubber.

16. A vulcanizable rubber composition according to claim 15, wherein the amount of said sulfur (C) is from about 0.2 to about 4.0 parts by weight per 100 parts by weight of said rubber, wherein the amount of said organic accelerator (D) is from about 0.2 to about 5.0 parts by weight per 100 parts by weight of said rubber, and wherein said uncured rubber blend contains up to about 50 percent by weight of natural or synthetic isoprene rubber.

17. A composition according to claim 16, wherein said vinylpyridine monomer is 2-vinylpyridine or 4-vinylpyridine, and wherein said butadiene hydrocarbon monomer is 1,3-butadiene.

18. A composition according to claim 17, and wherein said co-activator contains from about 30 to about 55 percent by weight of vinylpyridine units.

19. A composition according to claim 17, wherein said co-activator contains from about 35 percent to about 50 percent by weight of vinylpyridine units, and wherein the amount of said carton black (F) is from about 20 parts by weight to about 80 parts by weight per 100 parts by weight of said rubber.

20. A vulcanized rubber comprising the cured product of claim 14.

21. A vulcanized rubber comprising the cured product of claim 17.

22. A vulcanized rubber comprising the cured product of claim 19.

* * * * *